US008155039B2

(12) United States Patent
Wu et al.

(10) Patent No.: US 8,155,039 B2

(45) Date of Patent: Apr. 10, 2012

(54) SYSTEM AND APPARATUS FOR CASCADING AND REDISTRIBUTING HDTV SIGNALS

(75) Inventors: Shiquan Wu, Nepean (CA); Timothy D. Collings, Surrey (CA); Jung Yee, Ottawa (CA)

(73) Assignee: Wi-LAN, Inc., Ottawa (CA)

(*) Notice: Subject to any disclaimer, the term of this patent is extended or adjusted under 35 U.S.C. 154(b) by 600 days.

(21) Appl. No.: 12/337,336

(22) Filed: Dec. 17, 2008

(65) Prior Publication Data

US 2009/0235316 A1 Sep. 17, 2009

Related U.S. Application Data

(60) Provisional application No. 61/064,614, filed on Mar. 17, 2008.

(51) Int. Cl.
*H04B 7/00* (2006.01)

(52) U.S. Cl. ........................................ 370/310

(58) Field of Classification Search ................ None
See application file for complete search history.

(56) References Cited

U.S. PATENT DOCUMENTS

| | | | | |
|---|---|---|---|---|
| 6,327,300 | B1 | 12/2001 | Souissi et al. | |
| 6,385,434 | B1 | 5/2002 | Chuprun et al. | |
| 7,710,919 | B2 * | 5/2010 | Woo et al. | 370/329 |
| 2004/0085892 | A1 * | 5/2004 | Walton et al. | 370/208 |
| 2007/0183591 | A1 | 8/2007 | Geile et al. | |
| 2008/0004839 | A1 * | 1/2008 | Papadimitriou et al. | 702/182 |
| 2008/0089281 | A1 | 4/2008 | Yoon et al. | |
| 2008/0165680 | A1 * | 7/2008 | Chang | 370/230 |
| 2008/0192686 | A1 * | 8/2008 | Cho et al. | 370/329 |
| 2008/0293353 | A1 * | 11/2008 | Mody et al. | 455/1 |
| 2009/0144791 | A1 * | 6/2009 | Huffman et al. | 725/114 |
| 2009/0235316 | A1 * | 9/2009 | Wu et al. | 725/81 |
| 2010/0124254 | A1 * | 5/2010 | Wu et al. | 375/131 |
| 2010/0309317 | A1 * | 12/2010 | Wu et al. | 348/180 |

* cited by examiner

*Primary Examiner* — Chi Pham
*Assistant Examiner* — Fan Ng
(74) *Attorney, Agent, or Firm* — Procopio, Cory, Hargreaves & Savitch LLP

(57) ABSTRACT

Redistribution of multimedia signals or the like within a service area is performed by identifying one or more pieces of white space in the VHF/UHF spectrum, selecting a carrier frequency for each piece of white space spectrum, parsing the signal into a like number of components and modulating each component over a carrier frequency. The receiving device performs the reverse operation for reconstructing the signal.

21 Claims, 6 Drawing Sheets

SYSTEM AND APPARATUS FOR CASCADING AND REDISTRIBUTING HDTV SIGNALS

CLAIM OF PRIORITY

This U.S. patent application claims priority to U.S. Provisional Patent Application No. 61/064,614 entitled "System and Apparatus for Cascading and Re-Distributing HDTV Signals" filed Mar. 17, 2008, which is hereby incorporated by reference.

BACKGROUND

1. Field of the Invention

This invention relates generally to the local distribution of high bandwidth information signals.

2. Description of Related Art

There is a recognized demand to provide an inexpensive and efficient way to broadcast multimedia content within a specified small area using wireless solutions. Such small areas include single-family residential, multi-dwelling units, small/home offices, small businesses, multi-tenant buildings, and public and private campuses, all characterized by a restricted space, with numerous obstacles such as walls, furniture, metallic appliances, etc. There is a trend to provide the subscribers in this market with architectures that are comfortable, easy to use and attractively priced for consumers.

Current hardwire solutions require cabling hardware, with concomitant logistical overhead and aesthetic issues. Wireless methods are known, but such methods typically require significant compression prior to local distribution, and an a-priori reservation of wide, interference-free bandwidth. In addition, to make a wireless solution attractive from cost considerations point of view, the currently known architectures use, or propose to use, the un-licensed spectrum. Still further, wireless distribution of this type of signals in this type of environment is not a trivial task due to, for example, the interference between the signals in adjacent location, interference with other services present in the area, and the geography of the respective area.

For example, current local area distribution of high bandwidth information signals such as High-Definition Television (HDTV) signals has to conform to a variety of system constraints. As one illustrative example, a typical HDTV home system has a set top box (STB) connected to a service provider through an optical fiber, DSL link or satellite-downlink. The STB receives and decodes a Moving Picture Experts Group (MPEG) signal into a signal format compatible with the user's display. One common signal format uses the High-Definition Multimedia Interface (HDMI) technology. The HDMI formatted signal must then be transmitted to the user's video display. A hardwired connection is the most popular option for this connection. Frequently though, locations are without, or are not suitable for, high bandwidth hardwired systems. Further, aesthetic matters pertaining to cables may render such connections undesirable.

One potential wireless method is wireless HDTV. In such architecture, the set-top box decodes the MPEG data and then transmits it wirelessly over a 60 GHz band to the TV set via a built-in HDMI interface. While this solution reduces the cabling necessary for connecting the devices, it has important disadvantages. For example, a very high data link is needed since the data between the set-top and the TV set is not compressed. As well, the area in which the desired signal may be received with acceptable quality is quite small (up to a radius of 10 m). Some solutions proposed to address this issue involve the use of beam-forming technology, but this increases the costs and reduces the space available for the overall system hardware.

Another known solution for distributing a received information signal within an area, such as a residence or business establishment, is the conventional repeater. A conventional repeater receives the information signal, amplifies and retransmits it. However, conventional repeaters have shortcomings. One is that governmental and other imposed allocation of spectra may limit such conventional retransmission. Another is that a conventional repeater typically amplifies and repeats not only the information signal of interest but also various noise and interference signals. The result may be a degraded signal received by the end user.

Still another solution is use of Wi-Fi technology for in-house transmission, which operates in the 2.4 and 5 GHz unlicensed bands. However, conventional Wi-Fi may not provide a sufficient continuous data rate to satisfactorily support the HDTV picture quality. Further, link quality in Wi-Fi is often compromised due to various and often uncontrollable interference.

SUMMARY OF THE INVENTION

Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts are provided by the entire disclosure. Also, the following meanings shall apply to all instances of each of the terms identified below, except in instances where otherwise clearly stated, or in specific instances where, from the specific context in which the term appears, a different meaning is clearly stated.

It is an object of the invention to provide systems and methods for redistributing signals over a wireless connection within a service area, without disturbing or affecting the delivery of primary services available in that area. In this specification, the term "primary services" is used for digital TV broadcast and wireless microphone applications. The term "service area" or "service location" is used to designate single or multi-dwelling units, small office/home office, small businesses, multi-tenant buildings, public and private campuses, etc. It is mandatory for any secondary services sharing the spectrum with the primary services to avoid any disturbance of the primary services.

It is another object of the invention to detect pieces of white space that are not used by the primary services in a certain area and to use such white space for secondary services such as in-house wireless TV broadcast, or redistribution of voice, video and/or data signals. In this specification, the term "white space" refers to pieces of spectrum that are not used for primary services, i.e. available in the service area. It includes, for example, spectrum available in the VHF/UHF band, which is not used by the primary services. It is to be emphasized that the white space differs from TV market to TV market and also may be different in the same TV market from area to area, due to the presence of the wireless microphone applications or competing secondary services operating in the respective area.

It is still another object of the invention to provide solutions for redistributing signals over a wireless connection within a service area, which require minimal changes to the existing equipment. For example, the architectures described herein enable redistribution of TV signals with minimal changes to the TV receiver.

Accordingly, the invention provides a gateway for redistributing an information signal of a specified bandwidth within a service area, comprising: a spectrum detector for identifying k pieces of white space sufficient to accommodate the bandwidth of the information signal; and a transmitter for transmitting the data signal over the k pieces of white space, where k is an integer, $k \geqq 1$.

The invention also provides a method for redistributing an information signal of a specified bandwidth within a service area comprising: a) identifying k pieces of white space sufficient to accommodate the bandwidth of the information signal; and b) broadcasting the data signal over the k pieces of white space, where k is an integer, $k \geqq 1$.

Still further, the invention is directed to a device for receiving an information signal transmitted within a service area comprising: an antenna for capturing k RF signal components carried on k frequency carriers, where k is an integer; k demodulator branches, each for demodulating a respective RF signal component into an information signal component; and a combiner for combining the information signal components into the information signal.

Advantageously, the invention provides low equipment costs, achieves better performance, enhances spectrum utilization, and therefore provides a particularly effective wireless redistribution of signals, and in particular of TV signals.

The foregoing objects and advantages of the invention are illustrative of those that can be achieved by the various exemplary embodiments and are not intended to be exhaustive or limiting of the possible advantages which can be realized. Thus, these and other objects and advantages will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

BRIEF DESCRIPTION OF THE DRAWINGS

The invention is next described with reference to the following drawings, where like reference numerals designate corresponding parts throughout the several views, wherein:

FIG. 7 shows how the signal is parsed into k blocks, and FIG. 8 shows selection of "best" pieces of spectrum from different parts of the white space spectrum, with a view to obtain the bandwidth needed for signal redistribution.

DETAILED DESCRIPTION

Figure 1:
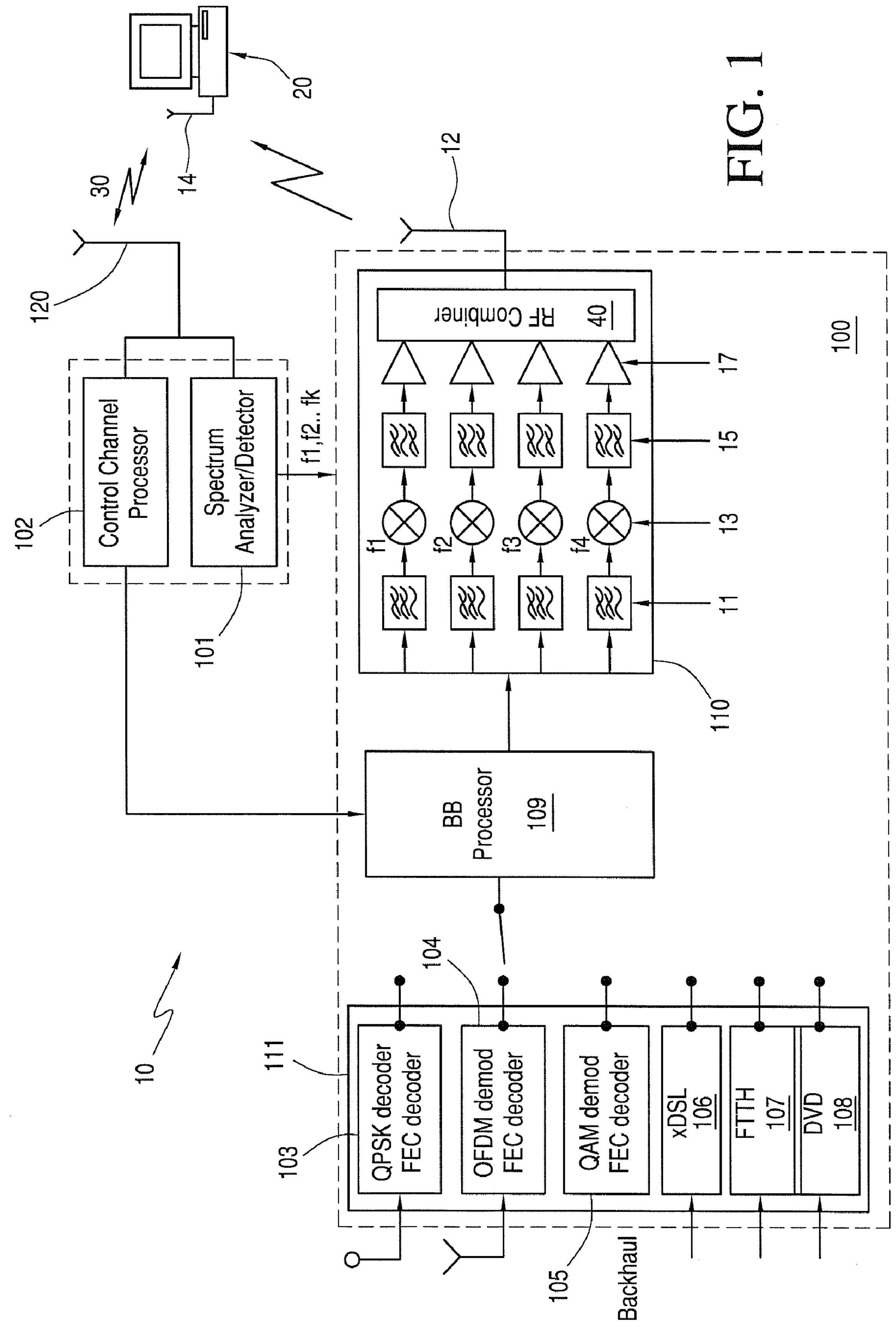
FIG. 1 shows a block diagram of an embodiment of a wireless gateway for redistributing signals to user devices operating in a service area, according to an embodiment of the invention.

It is known that various regulatory bodies around the word allocate the spectrum for specific uses and, in most cases, license the rights to parts of the spectrum. These frequency allocation plans, in many cases, mandate that specified parts of spectrum remain free (unused) between allocated bands for technical reasons (e.g. to avoid interference). As well, these regulatory bodies provide for unused spectrum which has either never been licensed, or is becoming free as a result of technical changes. Efficient use of this valuable resource is the current research trend snugly tied to the evolution of modern data communication systems.

There is a global trend to transition from the analog to digital TV (DTV), driven by the higher quality of the digital signals resulting in a better viewer experience, ability of providing personalized and interactive services, and a more efficient use of the spectrum.

For example, in North America, the TV broadcasters currently use the VHF (very high frequency) and/or the lower part of the UHF (ultra high frequency) spectrum in the 54 MHz and 698 MHz bands. Each TV station is currently assigned a channel occupying 6 MHz in the VHF/UHF spectrum. The Federal Communications Commission (FCC) has mandated that all full-power television broadcasts will use the ATSC standards for digital TV by no later than Feb. 17, 2009. Conversion to DTV results in important bandwidth becoming free in this part of the spectrum. This is because each TV station broadcasting DTV signals in a certain geographic region/area (known as a TV market) will use a limited number of channels, so that the spectrum not allocated to DTV broadcast in that region will became free after transition to digital TV broadcast.

This locally available spectrum is called "white space"; it is to be noted that the white space available in the VHF/UHF spectrum differs from TV market to TV market. In addition, free spectrum may also be available in the unlicensed spectrum in the 2.4 GHz band, which is now shared by Wi-Fi, Bluetooth devices, amateur radio, cordless telephones, microwave ovens, etc; or in the 5 MHz band used mainly by the Wi-Fi devices.

The FCC intends to allocate channels 2 through 51 to digital TV; channels 52 through 69 that occupy the lower half of the 700 MHz band have been already reallocated through auction to various advanced commercial wireless services for consumers. When transition to DTV ends in early 2009, every one of the nation's 210 TV markets may have up to 40 unassigned and vacant channels reserved for broadcasting, but not in use. Vacant TV channels are perfectly suited for other unlicensed wireless Internet services. Access to vacant TV channels facilitates a market for low-cost, high-capacity, mobile wireless broadband networks, including the emerging in-building networks. Using this white space, the wireless broadband industry could deliver Internet access to every household for as little as $10 a month by some estimates.

The term "TV channel" refers here to a frequency channel currently defined by a DTV standard, such as, for illustrative example, and without limitation, "Channel 2" or "Channel 6" specified by the North America NTSC standard within the VHF band. The term "piece of spectrum" is used for a portion of the frequency spectrum, and the term "white space channel" is used for a logical channel formed by one or more wavelet channels allocated to a certain device for a respective secondary service: it can include a wavelet channel or a combination of wavelet channels, consecutive or not.

The present invention provides methods and systems for redistribution of video, data and/or voice signals, generally called "information signals", in a service area and more particularly to a system for cascading such signals using the white space available within the area where the devices are located. The invention is described for the particular example of the North America Advanced Television Systems Committee (ATSC) standards for DTV, which mandates a bandwidth of 6 MHz for each TV channel. However, the invention is not restricted to identifying and using pieces of spectrum 6 MHz wide; applying the techniques described here, narrower or larger pieces of spectrum may be detected and used. For example, the invention is also applicable to DTV channel widths such as 8 MHz (Japan) and/or 7 MHz (Europe). As another example, if one or more pieces of a white space within a 6 MHz piece of spectrum not occupied by a DTV channel in a certain market are occupied by wireless microphones or/and other services, the reminder of that spectrum can also be used according to this invention. Still further, the invention is described in connection with local wireless TV broadcast over the spectrum unused by DTV broadcast and other primary services, but the same principles are applicable for white space in other parts of the spectrum, such as in the 2.4 or 5 GHz unlicensed bands. It is also noted that the signals that are redistributed need not necessarily be TV signals, in which case the white space band needed for such signals can be more or less than the width of a DTV channel.

To reiterate, while the following description refers particularly to examples of North America DTV standards and redistribution of HDTV signals inside a home, the invention is applicable to other DTV standards, is not limited to redistribution of H/DTV signals, and does not refer only to the white space freed by transition from the analog to digital TV. Rather, it is applicable to wireless redistribution of any video, voice and/or data signals of interest, using white space identified in any parts of the spectrum.

FIG. 1 shows a block diagram of a gateway 100 according to an embodiment of the invention. Gateway 10 is in communication with one or more devices 20 in a master-slave relationship. The term "devices" designate, in broad terms, any piece of wireless-enabled equipment used within a service area (e.g., a home). For example, a device can be a TV set (equipped with a separate or built-in set-top box), a personal computer, laptop, notebook, Blackberry™ device or equivalent, PDA, etc.

Gateway 10 comprises a transmitter 100, a spectrum analyzer 101, and a control channel processor 102. FIG. 1 also shows a user device 20 which communicates with gateway 10 over a wireless link, as shown by antennas 12, 14. Spectrum analyzer and detector 101 identifies the white space available in the respective area by scanning a specified spectrum section or sections of the wireless communication spectrum, and provides this information to the transmitter 100. The term "specified spectrum sections" over which the white space is sensed is preferably preset to a certain part (or parts) of the spectrum that are known to be underutilized in a certain region such as, for example, the spectrum freed by transition from analog to digital TV. The selected part of the spectrum may also include parts of the unlicensed spectrum, and is preferably specified when the system is installed.

Spectrum analyzer 101 senses the wireless signals present in the scanned spectrum portions using an antenna 120. The Rx signals may be HDTV signals, signals used by wireless microphone applications, or by secondary services active in the area.

In general, spectrum analyzer 101 could be any spectrum detector/analyzer; preferably a wavelet spectrum analyzer is used in this invention. The wavelet spectrum analyzer 101 scans the selected parts of the spectrum; the wavelet spectrum analyzer may use a pre-determined scanning sequence or, as one alternative, may use a dynamically updated sequence. Thus, the scanning sequence may include the entire VHF/UHF spectrum, the spectrum that is not occupied by the DTV broadcast in the respective area (known) or just the spectrum occupied by channels which are known to be unused for the TV broadcast (e.g., channels 2, 3, 5 and 7). As well, the scanning sequence may include only portions of one or more of these channels. In summary, the scanning sequence may take into consideration the known spectrum occupancy available in the respective TV market, and may also consider other parts of the spectrum than the VHF/UHF band.

Continuing with the illustrative example of FIG. 1, it will be assumed that the total bandwidth searched for is 6 MHz, to enable retransmission of an HDTV channel, which includes, for example, video content, close-captioning, and surround-sound audio. The specific multimedia content of the HDTV signal is not particular to the invention. As will be understood from reading this disclosure, the setting of such quality thresholds may be made by applying standard communication system design practices and skills well known to persons of ordinary skill in the digital communication arts.

The wavelet spectrum analyzer 101 operates by generating wavelet functions, and is described in further details in connection with FIGS. 4-7. In principle, the communication spectrum is devised as a frequency and time map having a plurality of frequency-time cells. Each frequency-time cell within the frequency and time map constitutes at least one piece of spectrum that may be utilized for communication purposes. Using wavelet signal analysis, signal energy within each of the frequency-time cells is measured against thresholds in order to identify frequency-time cells with little or no detectable signal activity. Such identified frequency-time cells provide an opportunity for signal transmission and reception during communication inactivity periods within these frequency-time cells. The spectrum analyzer then provides the frequency and time information to the transmitter 100; this information is shown on the arrow between blocks 101 and 100, {fk, BW}, where fk is the carrier frequency selected within the respective pieces of spectrum, and BW is the available bandwidth.

Preferably, the spectrum analyzer scans the TV spectrum starting from a pre-defined spectrum table that provides the regional spectrum occupancy table that indicates the channels used by the TV broadcasters in that region (TV market). Once the white space needed for transmission of the respective secondary service is identified based on the bandwidth of the information signal, the transceiver reserves it and indicates to devices 20, using e.g. downlink spectrum allocation maps, the frequencies where, and times when, to receive the information signal. Transmitter antenna 12 is used for transmitting the information signal to device 20; device 20 captures this signal using device antenna 14.

The control channel processor 102 is used for enabling devices 20 to communicate with the gateway 10 over a control channel 30. For example, this can be a bidirectional control channel, where the uplink bandwidth is shared by all devices served by gateway 10 for connection set-up (as a rendezvous channel), for communicating to the transmitter access requests, bandwidth requests, and generally for enabling signaling for setting-up, maintaining and tearing-down connections, as known to persons skilled in the art. The downlink bandwidth allocated to this channel is used by gateway 10 to control operation of the devices. Alternatively, the downlink control data may be sent in-band, and channel 30 may be used as a unidirectional channel from enabling the devices to send uplink messages to the gateway.

Transmitter 100 includes in the example of FIG. 1 an interface unit 111, a baseband processor 109 and a distributor unit 110. The transmitter is adapted to process the information signal received from various sources over interface unit 111, and retransmit the signal to the device 20 over the free space identified by the unit 101.

Interface unit 111 comprises, in the variant shown in FIG. 1, a plurality of interfaces 103-108, shown to illustrate that transceiver 100 is adapted to receive, process and/or redistribute information signals to users it serves. These interfaces include conventional equipment used to convert signals of various formats, received from various sources over various media (e.g., cable, air, wire) into baseband signals. It is to be noted that the interfaces 103-108 illustrated on FIG. 1 are not exhaustive, and also that transceiver unit 100 need not be equipped with all these interfaces. By way of example, FIG. 1 shows a Quadrature Phase-Shift Keying/Forward Error Correction (QPSK/FEC) decoder 103, an Orthogonal Frequency-Division Multiplexing/FEC (OFDM/FEC) decoder 104, a Quadrature Amplitude Modulation/FEC (QAM/FEC) decoder 105, a Digital Subscriber Line (xDSL) unit 106, a Fiber to the home (FTTH) unit 107, and a Digital Versatile Disc (DVD) unit 108.

"Cascading HDTV signals" as described here refers to the situation when no integral 6 MHz piece of spectrum is available. As indicated above, the bandwidth for cascading a 6 MHz channel to devices 20 may be found in the VHF/UHF spectrum; however, it is equally possible to identify and use white space from other frequency bands. Cascading may bridge the signal into another unregulated spectrum, such as, 2.4 GHz, or combine free spectrum identified in both 2.4, 5 GHz and VHF/UHF bands.

In order to cascade the signal to the device 20, the baseband processor 109 first formats the baseband signal received from one of the interfaces 103-108 as needed for transmission over the identified white space. In the example used for describing the invention, the baseband signal is formatted in processor 109 in compliance with the ATSC standard. As will be understood by persons skilled in the art, this operation requires pre-existing ATSC-compatible equipment. The baseband processor also parses the signal if the white space spectrum identified is fragmented, as will be described in further detail later. The term "parse" is used here as a functional descriptor for operations chosen to separate the information signal into blocks, and has no limitation as to implementation of this functionality.

Distributor unit 110 modulates the information signal over k pieces of free spectrum identified by the spectrum analyzer. Unit 110 is shown with four branches (k=4) in FIG. 1 by way of example; more or less branches may be used. In order to distribute the multimedia signal over the k pieces of free spectrum, the information signal from interface 111 is parsed (reverse-multiplexed) into k data blocks of a certain number of bits, and each data block modulates a carrier fk. It will also be understood that the k=4 blocks implementation is only one example, selected to describe one parsing scheme. It is however evident that the invention is not limited to this granularity of scanning and identifying pieces of white space, so that the number of branches of distributor 110 can be different from four. Nonetheless, it is most probable that the necessary bandwidth for redistribution of the information signal in the home can be obtained from up to four pieces of white space.

Each branch of distributor 110 processes one of the components of the information signal, using a respective low pass filter 11, a modulator 13 for modulating the blocks parsed from the information signal over a respective carrier frequency fk (here f1-f4), a RF filter 15 for shaping the modulated signal, an amplifier 17 and a combiner 40 for combining the RF components of the information signal from all branches before distributing these to the devices 20 over antenna 12. The filters, modulators, amplifiers and the combiner may be of a generally known design and, therefore, are not described in further detail.

For example, if the white space spectrum identified by unit 101 is made of four pieces, the information signal is parsed by the BB processor 109 into four blocks of M bits each; for example, the information signal may be broken into 16-bit blocks (M=16), and each 16-bit block will modulate one of the carriers f1-f4. The term "signal component" is used for identifying the part of the information signal provided on each branch of distributor 110. As will be understood, M is selected according to the data rate, the signal modulation scheme and other design parameters; selection of M is outside the scope of the invention. Also, it is possible for all four pieces of white space to have the same size, but it is equally possible to have different sizes, which also impacts on the selection of M. For example, the modulation scheme may be quadrature amplitude modulation (QAM); in this case, each branch unit 110 is equipped with a QAM modulator 14. As another example, the raw data rate for an ATSC signal, at a 1920×1080 resolution, assuming ten (bits) per pixel, and 60 frames-per-second (fps), is 1.244 Gbps. The associated compressed data rate would, under this illustrative example hypothetical, be roughly 30 Mbps.

It is also possible to identify the white space needed for redistribution of a certain signal from n pieces of white space, where n≦k. For example, a piece of white space spectrum of only 3 MHz could be available within the spectrum otherwise allocated for channel 5 (when e.g. 3 MHz in this band are occupied by another primary service such as a wireless microphone, etc). A second piece of white space spectrum of 3 MHz could be available in channel 7. In this example, only two wavelet channels are needed to form a white space channel of 6 MHz and the reminder of the branches may be used for redistributing data signals to other devices, or for achieving space diversity. As another example, if four 6 MHz pieces of white space are identified, each may be used for redistributing an entire TV channel to one device 20, so that four devices 203 can receive distinct multimedia content.

According to still another embodiment of the invention, in the case when the white space identified by the spectrum analyzer is comprised of a 6 MHz wide piece, the distributor 110 may modulate the signal over the multiple carriers on the branches to obtain space diversity. In this case, the signal in each branch is a "copy" of the information signal rather than a component of the information signal, and the receiver will select the best quality copy received or will combine the copies.

Figure 2:
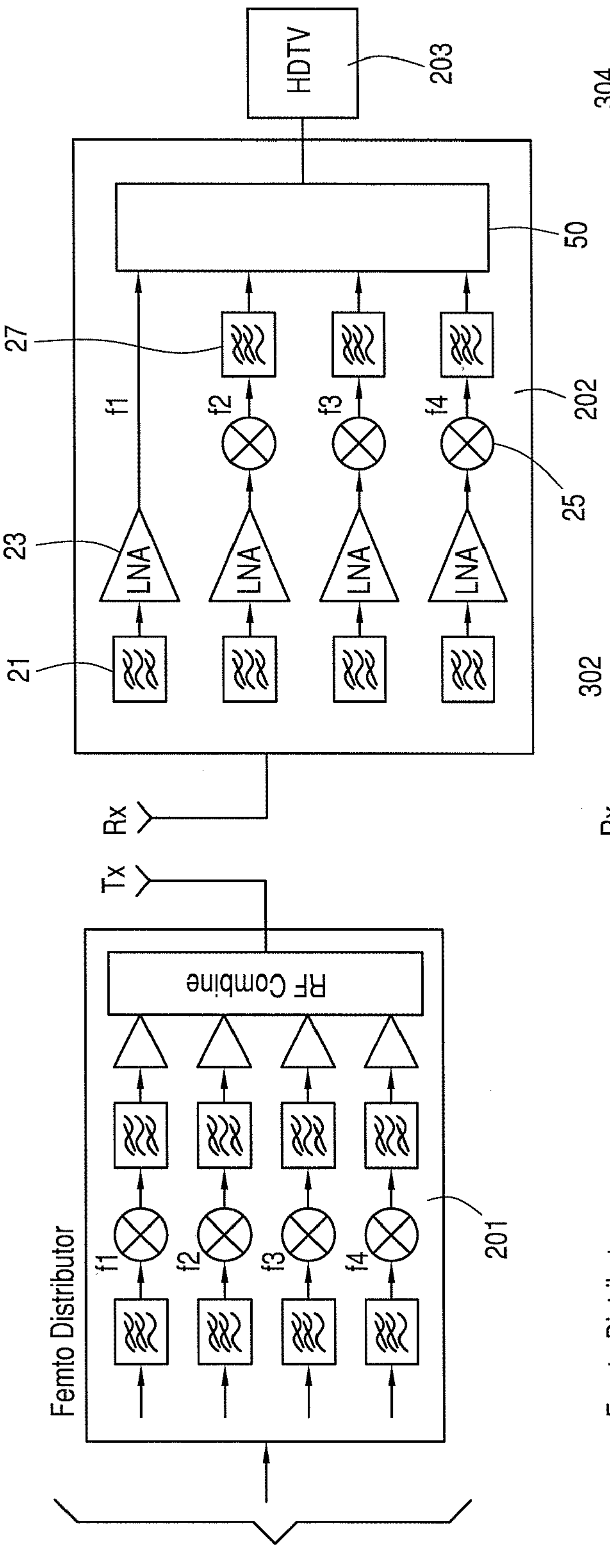
FIG. 2 shows a block diagram for a first variant of a device used for recovering the signals broadcast by the gateway.

FIG. 2 shows an embodiment of a receiving unit 202 in communication with the distributor unit 201 of gateway 10. It receives the components of the information signal (or the signal as the case may be) from distributor 201 and re-formats these into the ATSC signal. Receiving unit 202 has also a branch structure, with one of the branches accounting for the case when the information signal is modulated over a single carrier, as shown by the upper branch. This upper branch includes a filter 21 and an amplifier 23. The remainder of the branches each have a respective RF filter 21 for separating the components received over the antenna according to the carrier frequency and shaping the respective component, an amplifier 23, a demodulator 25 and a low pass filter 27. When an ATSC signal is redistributed using two or more pieces of white space, the respective branches are tuned on the respective frequency f2-f4. In the case of space diversity, all branches receive copies of the same information signal different attenuations, depending on the path attenuation suffered by each of these variants. In this case, all demodulators mix the received signal with one frequency (f1 in the embodiment of FIG. 2). To reiterate, the number of the branches of the receiving unit 202 is a design parameter, and it could be different from four; the variable k is also used here for the general case.

The signals from the k branches are combined in combiner 50 to reconstruct the ATSC signal for the case when it has been previously parsed. Combiner 50 may also include circuitry that selects the best variant in case of a space diversity embodiment. The information about the status of the received signal (parsed or not) is received using signaling. The downlink signaling also provides the information about the number M of bits in each block and the frequency and time when the blocks are transmitted, as seen later in connection with FIG. 8.

Figure 3:
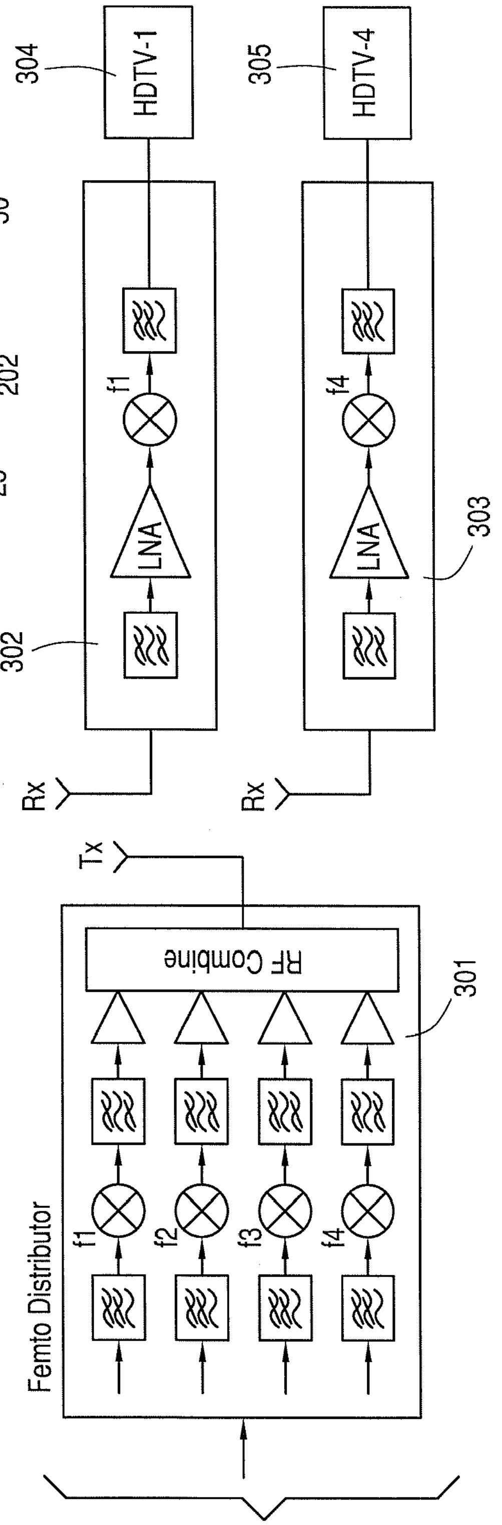
FIG. 3 shows a block diagram for a second variant of a device used for recovering the signals broadcast by the gateway.

FIG. 3 shows an example of a further embodiment using discrete receiving units 302, 303 that communicate with the distributor unit 301 of the gateway 10. Each receiving unit 302, 303 comprises a stand-alone receiver suitable for the case when each receives a distinct multimedia channel. In this embodiment, the white space pieces of spectrum are however 6 MHz each, for enabling redistribution of different TV channels to a plurality of users. While two receivers 302 and 303 are shown, the number of receivers may vary to correspond to and permit transmission of a respective signal to an equal number of devices 304, 305. For example, there may be four receivers 302 each coupled with a device 304 (HDTV sets in this example). As will be apparent to persons skilled in the art, one benefit of a multiple receiver system of FIG. 3 is the ability to transmit multiple programs to multiple users, each program using a carrier f1-fk.

Figure 4:
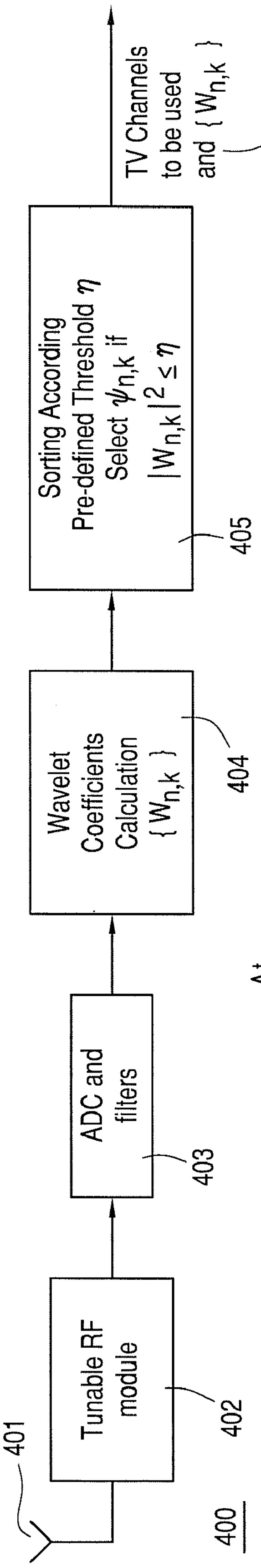
FIG. 4 shows the block diagram of a wavelet spectrum analyzer according to an embodiment of the invention.
Figure 5:
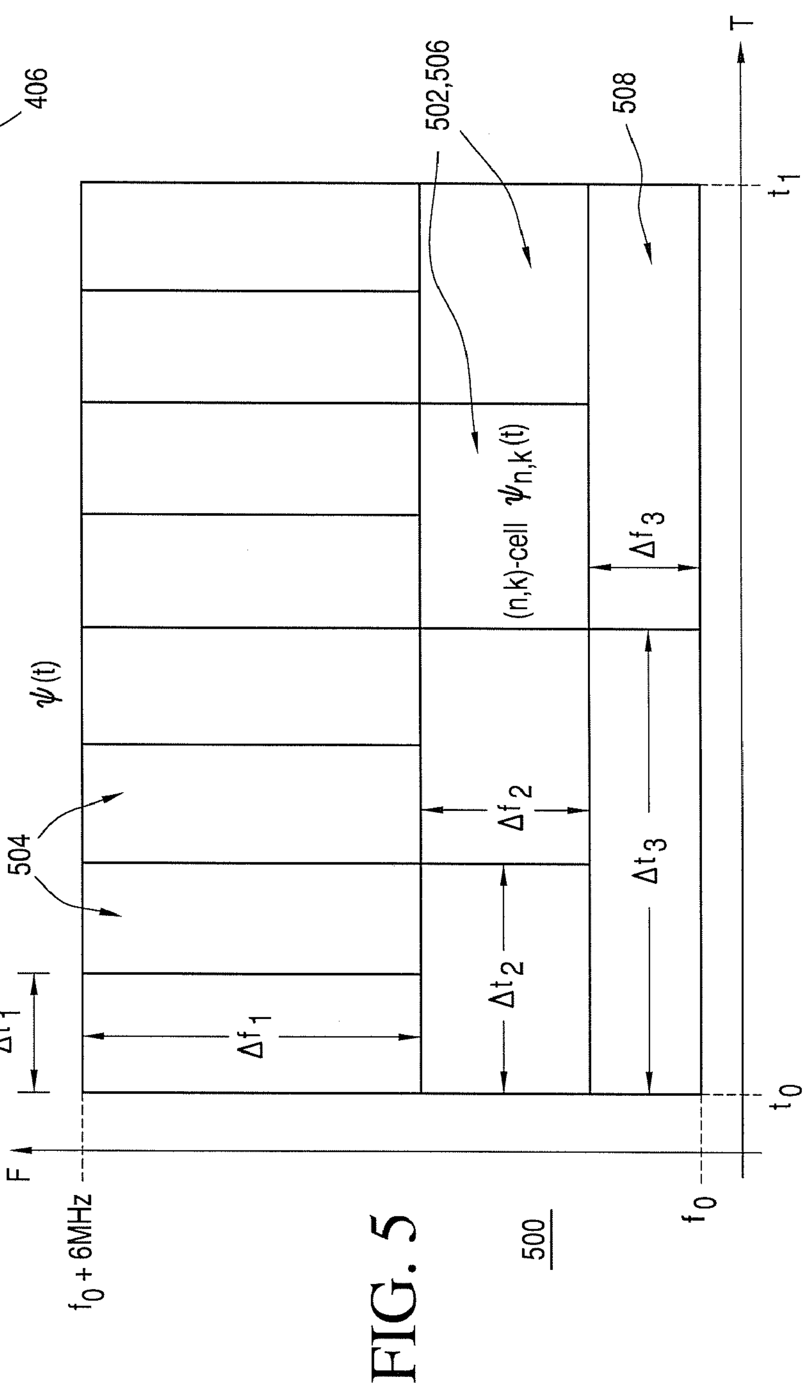
FIG. 5 shows an example of a time-frequency map used by the wavelet spectrum analyzer of FIG. 4.
Figure 6:
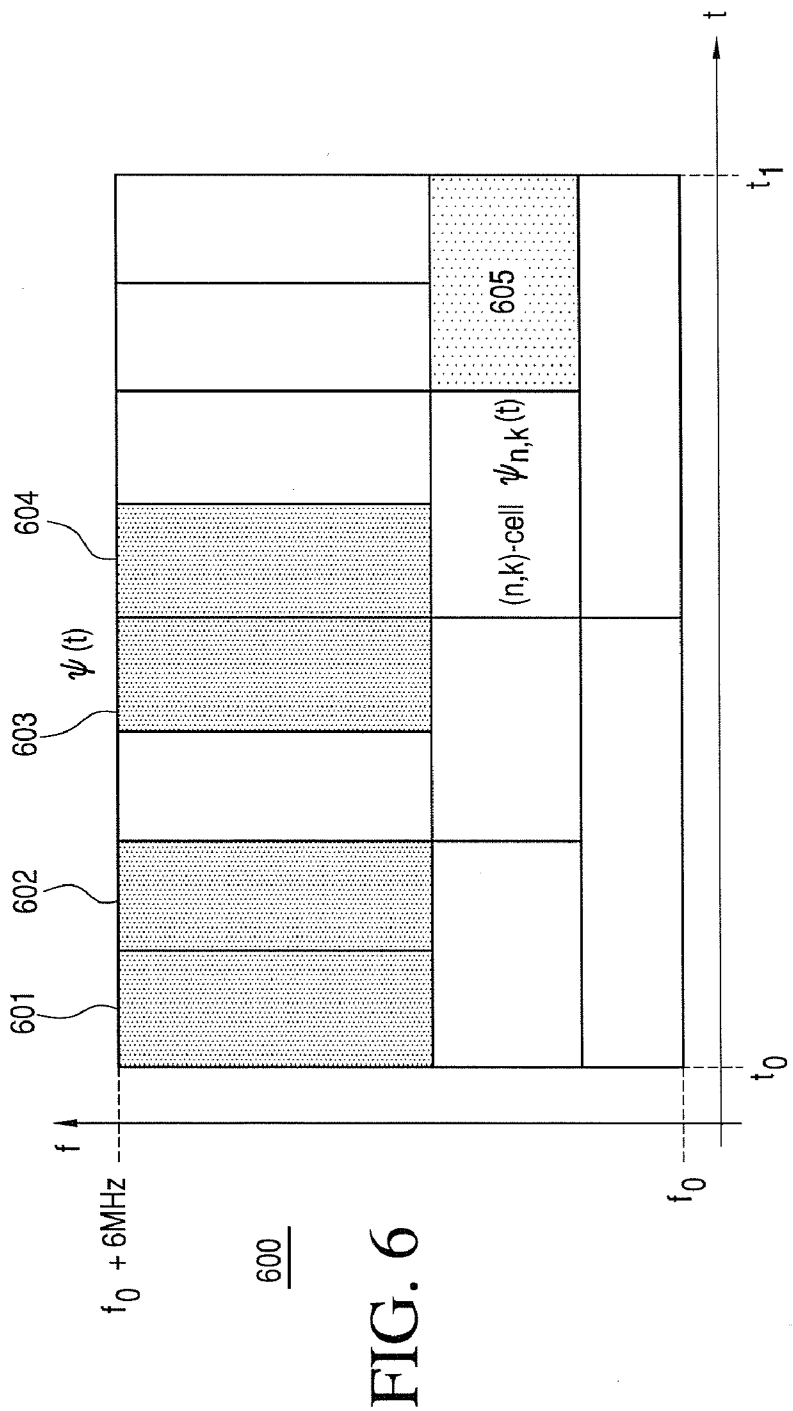
FIG. 6 shows an example of how the time frequency map of FIG. 5 can be used for detecting and selecting free pieces of spectrum.

FIGS. 4, 5 and 6 show operation of the wavelet spectrum analyzer and detector 101 of FIG. 1. FIG. 4 shows the block diagram of a wavelet spectrum analyzer, denoted here with 400, according to an embodiment of the invention. FIG. 5 shows an example of a time-frequency map and FIG. 6 shows an example of spectrum allocation on the time frequency map of FIG. 5.

The wavelet spectrum analyzer 400 shown in FIG. 4 determines the signal energy of the wireless signals within a pre-selected part/s of the wireless communication spectrum. For example, in cellular systems, the pre-selected part of the wireless spectrum includes the spectrum over which the cellular system operates. For the TV spectrum provided in the above example, analyzer 400 identifies pieces of white space in the VHF/UHF spectrum. If analyzer 400 detects one or more regions of the designated wireless communication spectrum having low or no signal energy, the analyzer accordingly identifies the frequency position and bandwidth of these low signal energy regions or any other regions with no detectable signal energy.

The wavelet spectrum analyzer 400 is equipped with an antenna 401 that collects the signals in the scanned spectrum. A tunable RF module 402 is tuned to scan successively the spectrum of interest, with a preset granularity. The signal received at module 402 is converted to a digital signal by an analog to digital converter (ADC) 403; the ADC 403 also includes the filters for shaping the signal. The wavelet analyzer further comprises a wavelet coefficients calculator 404 and a wavelet channel selector/sorter 405. Wavelet coefficient calculator 404 generates the respective wavelets for determining the wavelet coefficients for the signals detected in the cells of the frequency-time map shown in FIG. 5, and then outputs the wavelet coefficients to sorting unit 405 together with the associated cell coordinates (time and frequency). Selector or sorter 405 compares the energy against energy thresholds in order to select the cells with energy under the threshold, defining a piece of white space. The basic background on the wavelet functions used in this specification is provided next.

FIG. 5 shows a frequency time map 500 for a wavelet function $\psi(t)$. The frequency and time map 500 is comprised of a plurality of frequency and time cells, generically labeled 502, where each of frequency and time cell is representative of a section of the wireless communication spectrum that may be used in this invention for signal re-transmission. Different examples of the cells 502 are labeled 504, 506 and 508, as described in greater detail below.

The wavelet function is denoted with $\psi_{\alpha,\tau}(t)$ and the corresponding frequency domain representation is denoted with $\hat{\Psi}_{\alpha,\tau}(\omega)$, where $\alpha$ represents the scaling parameter of the wavelet waveform, while $\tau$ represents the shifting or translation parameter of the wavelet waveform. The wavelet function $\psi_{\alpha,\tau}(t)$ used in this invention is selected such that 99% of the wavelet energy is concentrated within a finite interval in both the time and frequency domain. This property of the wavelet function can be expressed, in the time domain, by Equation 1:

$$\int \psi_{\alpha,\tau}(t)=0. \qquad \text{Equation 1}$$

In addition, the wavelet function $\psi_{\alpha,\tau}(t)$ is selected so as to enable integer shifts (translations) of its concentration center, such that adjacent shifted waveforms $\psi(t-\tau)$ may be generated to form an orthogonal basis for energy limited signal space. Equation 2 expresses this characteristic for the time domain representation $\psi_{\alpha,\tau}(t)$ and Equation 3 for the frequency domain representation $\hat{\psi}_{\alpha,\tau}(\omega)$:

$$\psi_{a,\tau}(t) = \frac{1}{\sqrt{a}}\psi\left(\frac{t-\tau}{a}\right) \qquad \text{Equation 2}$$

$$\hat{\psi}_{a,\tau}\left(\omega = \sqrt{a^{-j2\pi\omega}}\,\hat{\psi}(a\omega)\right. \qquad \text{Equation 3}$$

Changes in the scaling parameter affects the pulse shape; if the pulse shape is dilated in the time domain, it will automatically shrink in the frequency domain. Alternatively, if the pulse shape is compressed in the time domain, it will expand in the frequency domain. For example, a positive increase in the value of the scaling parameter $\alpha$ compresses the wavelet waveform in the time domain; due to the conservation of energy principle, the compression of the wavelet waveform in time, translates to an increase in frequency bandwidth. Conversely, decreasing the value of the scaling parameter $\alpha$ dilates the wavelet waveform in the time domain, while reducing frequency bandwidth.

The shifting parameter $\tau$ represents the shifting of the energy concentration center of the wavelet waveform in time. Thus, by increasing the value of the translation parameter $\tau$, the wavelet shifts in a positive direction along the T axis; by decreasing $\tau$, the wavelet shifts in a negative direction along the T axis. It is apparent that both the shifting and scaling parameters provide the ability to dynamically adjust the resolution of the wavelet waveform in both time and frequency. Accordingly, the wavelet waveform characteristics may be manipulated to scan frequency-time cells of different granularity and thus identify pieces of white space within the frequency and time map 500.

FIG. 5 shows examples on how the scaling and translation parameters enable the frequency and time map 500 to be divided according to a selectable time-frequency resolution. For example, by setting the scaling parameter to a first value and incrementing the translation parameter, a plurality of cells 504 having a bandwidth of $\Delta f_1$ and a time slot interval of $\Delta t_1$ are provided. By setting the scaling parameter to a second value and incrementing the translation parameter, a plurality of cells 506 having a reduced bandwidth of $\Delta f_2$ and an increased time slot interval of $\Delta t_2$ are provided. Still further, setting the scaling parameter to a third value and incrementing the translation parameter provides a plurality of cells 508 having a further reduced bandwidth of $\Delta f_3$ and a further increased time slot interval of $\Delta t_3$.

Returning to FIG. 4, the wavelet coefficient calculator 405 calculates the wavelet coefficients $w_{n,k}$ of the digitized signals using Equation 4:

$$w_{n,k}=\int r(t)\psi\alpha_{n,k}(t) \qquad \text{Equation 4}$$

where r(t) is the signal captured in the respective time-frequency cell and $\psi_{n,k}(t)$ is the wavelet function, with $\alpha$ and $\tau$ selected in a particular way as a function of n and k. Details on wavelet functions and their use for detecting white space are provided in the co-pending US patent application "System and Method for Utilizing Spectral Resources in Wireless Communications" (Wu et al) filed Apr. 10, 2008, Ser. No. 12/078,979, which is incorporated herein by reference.

The calculated wavelet coefficients $w_{n,k}$ are then used to determine the signal energy in the respective cell comparing the signal energy corresponding to each detected signal to an energy threshold A, and the respective piece of white space (504, 506, 508) is selected if the detected energy is under the threshold:

$$|w_{n,k}|^2 \geqq \eta \qquad \text{Equation 5}$$

where $\eta$ is a predefined positive number representing the threshold for the energy level.

The predetermined threshold level $\eta$ may be pre-set, or may be configured to vary depending on the spectrum being scanned, the acceptable interference level, signal power, etc. General methods for setting thresholds for detecting signals in the spectrum of interest are known to persons skilled in the communication arts, and therefore, further details are omitted.

FIG. 6 shows, on a time-frequency map similar to that of FIG. 5, a particular example of white space detected using the wavelet analyzer 101. In this example, the cells 601, 602, 603, 604 and 605 have been identified as suitable for redistribution of a multimedia signal at a location of interest. As indicated above, these cells were selected since the measured energy levels are under the threshold $\eta$ applied by the sorting unit 405.

Figure 7:
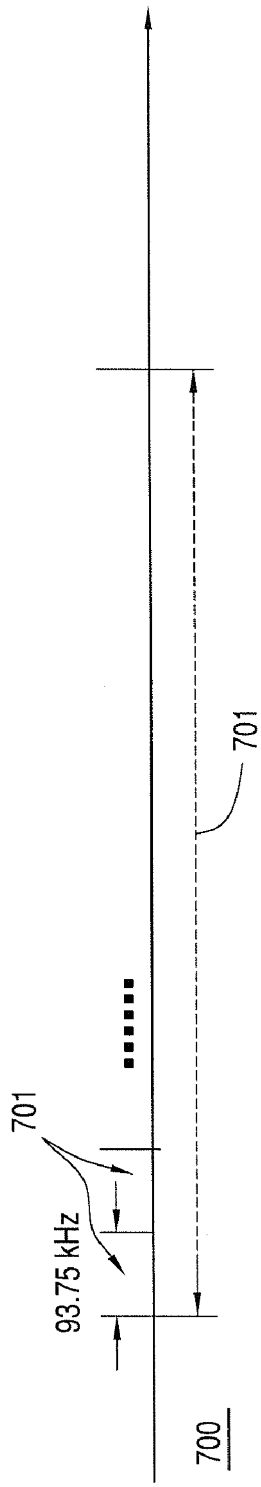
FIGS. 7 and 8 show an example of parsing the signal before redistribution over discontinuous pieces of white space spectrum according to an embodiment of the invention where.

FIG. 7 shows an example of segmentation of a 6 MHz spectrum 700 into N=64 slices 701, each slice having a width of 93.73 kHz (6 MHz: 64).

Figure 8:
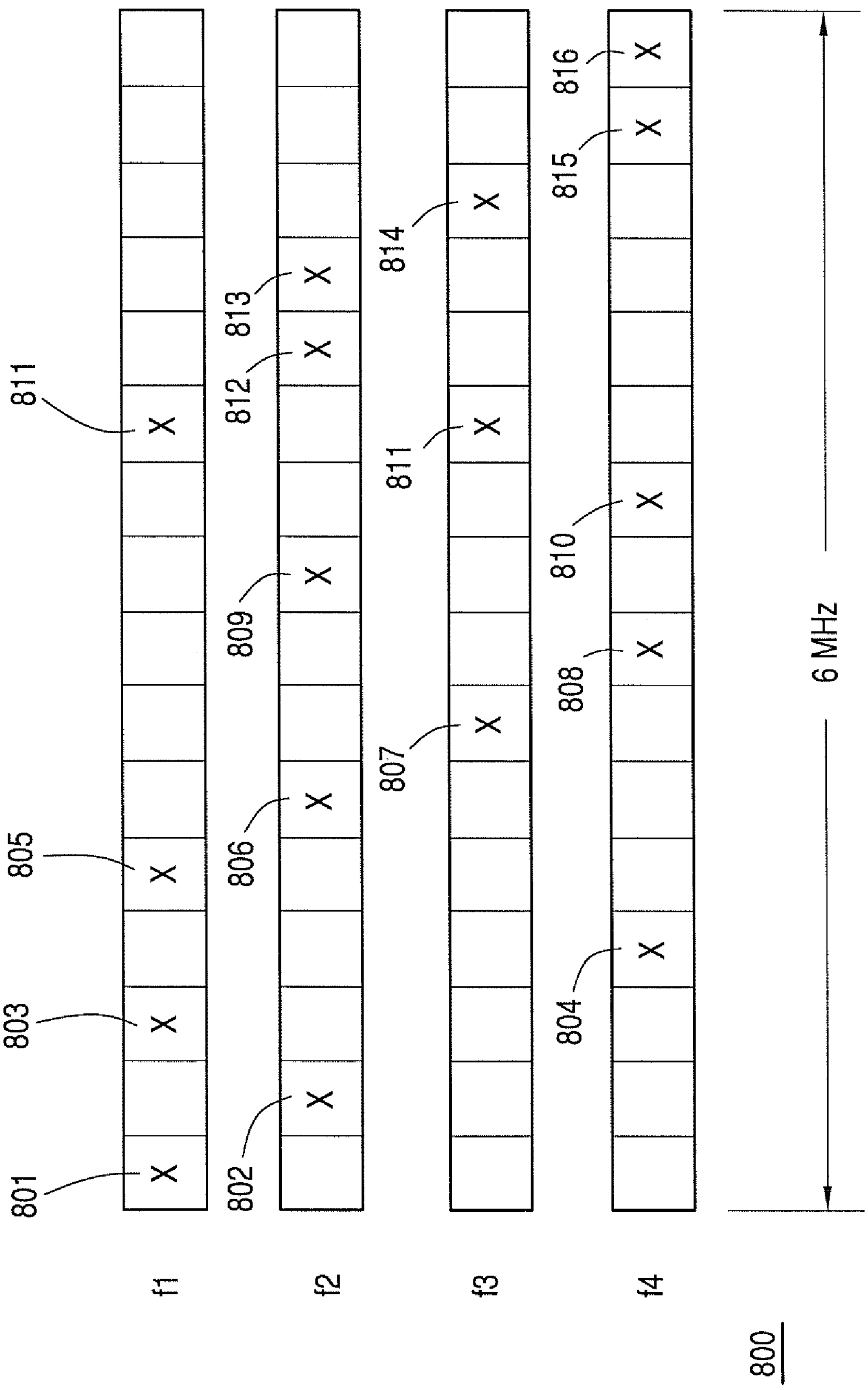

FIG. 8 shows a numerical example for selection of "best" pieces of spectrum from different parts of the spectrum, with a view to form a 6 MHz channel for cascading an HDTV signal within a home area. Namely, let's say that 6 MHz of spectrum can be obtained from four different pieces of spectrum, that may be detected within channels 2, 3, 5, and 7, which are not used for TV broadcasting in the respective area; parts of these channels may however be currently used by other currently active primary or secondary services. Since it is known that these channels are not used by TV broadcasters in the respective area based on publicly available spectrum occupancy tables, the wavelet analyzer 101 is set to scan only the spectrum allocated to these channels, using a frequency-time map built for this white space, and a $\Delta f$ of 93.75 kHz. This means that the spectrum allocated to each of these unused channels is divided into sixteen frequency-time cells, and the energy of the cells is measured for identifying the cells with the lower energy level. The total number of cells in all four bands is 16×4=64.

In order to transmit the signal over this fragmented white space spectrum, the information signal is parsed in such a way that the best pieces in each of the scanned channels are used for signal redistribution. Thus, the first 375 kHz (6 MHz: 16=375 kHz) block 801 of data from the information signal is directed on the first branch (carrier frequency f1) seen in FIG. 1, the second block 802, on the second branch, the third block 803 again on the first branch, the fourth on the fourth branch (f4), etc, and the $63^{th}$ and $64^{th}$ blocks 815 and 816 are directed to the fourth branch.

Figure 9:
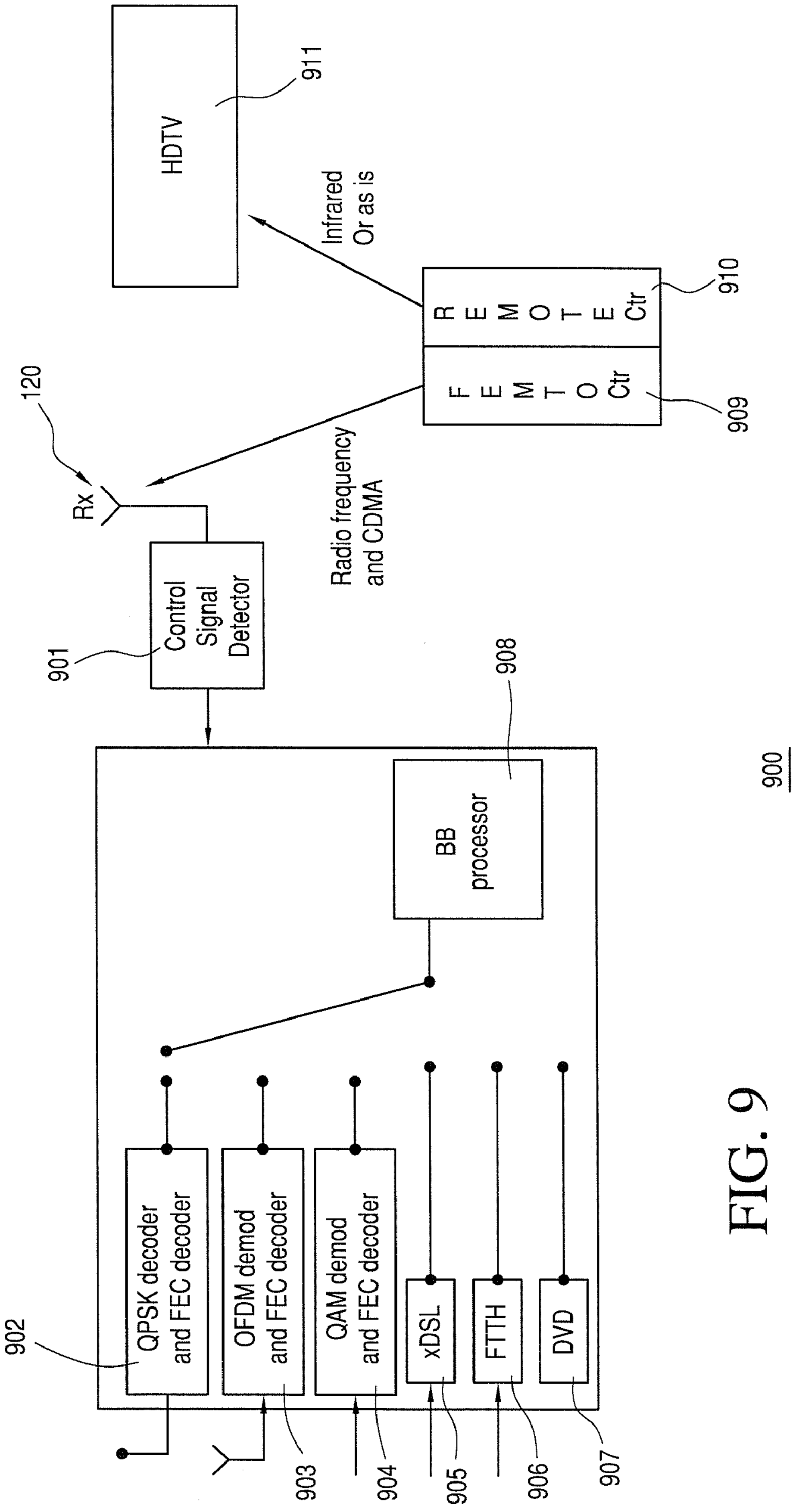
FIG. 9 shows a control mechanism for a particular example of a HDTV signal distributor.

FIG. 9 shows an example of how the uplink control mechanism can be implemented for a particular example of a HDTV transceiver. As indicated above, the uplink bandwidth on the control channel 30 (see FIG. 1) is shared by the devices 911 for signaling. The user interface for the control channel may be designed as an independent user unit 909 (e.g. in the shape of a remote controller) that communicates with the control signal detector 901 over channel 30. Alternatively, the control signaling may reuse existing HDTV remote controls 910, with additional keys/buttons. The wireless link between unit 909 and control signal detector 901 can be designed as a RF link or a CDMA link.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A gateway for redistributing an information signal of a specified bandwidth to a user device within a service area, comprising:

a spectrum detector for identifying k frequency-time cells of white space sufficient to accommodate the specified bandwidth of the information signal, where k is an integer, $k \geqq 1$, the spectrum detector comprising a tunable RF module for scanning specified spectrum sections and capturing any wireless signal present in the spectrum sections, an analog to digital converter for converting the captured wireless signal to a digital signal, a wavelet coefficient calculator for measuring an energy of the digital signal in each of a plurality of frequency-time cells formed within the specified spectrum sections, and a sorting unit for selecting the k-frequency-time cells of white space where the energy of the digital signal is under a threshold; and a transmitter for transmitting the information signal over the identified k frequency-time cells of white space to the user device;

wherein the wavelet coefficient calculator uses a wavelet function $\psi_{\alpha\tau}(t)$ providing a concentration of an energy of the frequency-time cells, in both time and frequency within a finite interval, according to this equation: $\int\psi_{\alpha\tau}(t)dt=0$, where $\alpha$ represents the scaling parameter of the wavelet waveform and $\tau$ represents the shifting parameter of the wavelet waveform.

2. A gateway as claimed in claim 1, further comprising:

a control device for transmitting control messages on a dedicated control channel; and a control signal detector for detecting the messages transmitted by the control device on the dedicated control channel.

3. A gateway as claimed in claim 2, wherein the dedicated control channel is a bidirectional control channel, and wherein the gateway controls a operation of at least one of the spectrum detector and the transmitter based on the detected messages.

4. A gateway as claimed in claim 1, wherein the gateway controls operation of at least one of the spectrum detector and the transmitter by transmitting in-band control messages.

5. A gateway as claimed in claim 1, wherein the spectrum detector scans a spectrum based on a given current allocation of channels for the service area.

6. A gateway as claimed in claim 1, wherein the spectrum detector selects a size of the frequency-time cells based on the bandwidth of the information signal and the detected current wireless activity at the service area.

7. A method for redistributing an information signal of a specified bandwidth, within a service area, comprising:

identifying k frequency-time cells of white space sufficient to accommodate the bandwidth of the information signal, where k is an integer, $k\geqq1$, the identifying comprising scanning specified spectrum sections and capturing any wireless signal (Rx) present in the specified spectrum sections converting the captured wireless signal to a digital signal, measuring an energy of the digital signal in each of a plurality of frequency-time cells formed within the specified spectrum sections, and selecting the k frequency-time cells of white space where the energy of the digital signal is under a threshold; and broadcasting the information signal over the identified k frequency-time cells of white space to a user device;

wherein scanning specified spectrum sections uses a wavelet function $\psi_{\alpha\tau}(t)$ selected to concentrate an energy of the frequency-time cell, in both time and frequency within a finite interval, according to this equation: $\int\psi_{\alpha\tau}(t)dt=0$, where $\alpha$ represents the scaling parameter of the wavelet waveform and $\tau$ represents the shifting parameter of the wavelet waveform.

8. A method as claimed in claim 7, further comprising detecting messages transmitted on a dedicated control channel.

9. A method as claimed in claim 8, wherein the control channel is a bidirectional control channel.

10. A method as claimed in claim 8, wherein the control channel is an uplink control channel, and downlink control messages are transmitted in-band with the data signal.

11. A method as claimed in claim 7, wherein said identifying k frequency-time cells comprises scanning a spectrum based on a given current allocation of channels for a TV broadcast at the service area.

12. A method as claimed in claim 7, wherein identifying k frequency-time cells of white space includes detecting a current wireless activity at the service area, and wherein the size of the frequency-time cells is selectable based on the bandwidth of the information signal and the current wireless activity detected at the service area.

13. A method as claimed in claim 7, wherein said measuring an energy comprises measuring the energy of the digital signal in each frequency-time cell by calculating a wavelet coefficient for the digital signal detected in the respective frequency-time cell.

14. A method as claimed in claim 7, wherein said calculating a wavelet coefficient uses shifted variants of the wavelet function $(\psi(t-\tau)$, and includes obtaining the shifted variants by performing integer shifts of an energy concentration center of the wavelet function, such that adjacent shifted waveforms $\{\psi(t-\tau)\}$ form an orthogonal basis.

15. A gateway for redistributing an information signal of a specified bandwidth to a user device within a service area, comprising:

a spectrum detector for identifying k frequency-time cells of white space sufficient to accommodate the specified bandwidth of the information signal, where k is an integer, $k\geqq1$, the spectrum detector comprising a tunable RF module for scanning specified spectrum sections and capturing any wireless signal present in the spectrum sections, an analog to digital converter for converting the captured wireless signal to a digital signal, a wavelet coefficient calculator for measuring an energy of the digital signal in each of a plurality of frequency-time cells formed within the specified spectrum sections, and a sorting unit for selecting the k frequency-time cells of white space where the energy of the digital signal is under a threshold; and a transmitter for transmitting the information signal over the identified k frequency-time cells of white space to the user device;

wherein the wavelet coefficient calculator is capable of measuring an energy of the digital signal in each frequency-time cell by calculating a wavelet coefficient for the digital signal detected in the respective frequency-time cell and wherein the wavelet coefficient calculator is capable of calculating the wavelet coefficient using shifted variants of a wavelet function $\psi_{\alpha\tau}(t)$, wherein the wavelet coefficient calculator obtains the shifted variants by performing integer shifts of an energy concentration center of the wavelet function, such that adjacent shifted waveforms $\{\psi(t-\tau)\}$ form an orthogonal basis, where $\alpha$ represents the scaling parameter of the wavelet waveform and $\tau$ represents the shifting parameter of the wavelet waveform.

16. A gateway for redistributing an information signal of a specified bandwidth to a user device within a service area, comprising:

a spectrum detector for identifying k frequency-time cells of white space sufficient to accommodate the specified bandwidth of the information signal, where k is an integer, $k\geqq1$; and a transmitter for transmitting the information signal over the identified k frequency-time cells of white space to the user device;

wherein the transmitter comprises a baseband processor for converting the information signal into a baseband signal and parsing the baseband signal into n signal components where n is an integer, n∈[1;k], and a distributor unit with k branches for modulating each carrier frequency corresponding to a respective frequency-time cell of white space with a signal component, and broadcasting k RF signal components over the respective frequency-time cells of white space, wherein each branch of the distributor unit modulates the baseband signal whenever a 6 MHz frequency-time cell of spectrum has been identified by the spectrum detector.

17. A gateway for redistributing an information signal of a specified bandwidth to a user device within a service area, comprising:

a spectrum detector for identifying k frequency-time cells of white space sufficient to accommodate the specified bandwidth of the information signal, where k is an integer, k≧1; and a transmitter for transmitting the information signal over the identified k frequency-time cells of white space to the user device;

wherein the transmitter comprises a baseband processor for converting the information signal into a baseband signal and parsing the baseband signal into n signal components where n is an integer, n∈[1;k]and wherein for n=1, all carrier frequencies are modulated with the same baseband signal for obtaining spatial diversity, and a distributor unit with k branches for modulating each carrier frequency corresponding to a respective frequency-time cell of white space with a signal component, and broadcasting k RF signal components over the respective frequency-time cells of white space.

18. A gateway as claimed in claim 17, wherein the transmitter further comprises an interface for converting source signals received from a variety of signal sources over a variety of media into the information signal.

19. A method for redistributing an information signal of a specified bandwidth, within a service area, comprising:

identifying k frequency-time cells of white space sufficient to accommodate the bandwidth of the information signal, where k is an integer, k≧1;

broadcasting the information signal over the identified k frequency-time cells of white space to a user device;

wherein broadcasting the information comprises converting the information signal into a baseband signal, parsing the baseband signal into n signal components, where n is an integer n∈[1;k], selecting a carrier frequency for each of the k frequency-time cells of white space, modulating each of the k carrier frequencies with a signal component, and broadcasting the n signal components over the respective frequency-time cells of white space; and wherein for n=1, all carrier frequencies are modulated with the same baseband signal for obtaining spatial diversity.

20. A method as claimed in claim 19, wherein for n=k, each component signal modulates a carrier frequency.

21. A method as claimed in claim 19, further comprising converting source signals received from a variety of signal sources over a variety of media into the information signal.

* * * * *